United States Patent [19]

Irino et al.

[11] Patent Number: 5,198,312
[45] Date of Patent: Mar. 30, 1993

[54] POWER GENERATION SYSTEM WITH FLAT FUEL CELLS OF SOLID ELECTROLYTE

[75] Inventors: Mitsuhiro Irino, Takasago; Tokuki Satake, Kobe; Hiroshi Sakai, Kobe; Masayuki Funatsu, Kobe; Hisao Haneda, Kobe; Masaru Ishibashi, Takasago; Koichi Takenobu, Kobe; Kiyoshi Watanabe, Kobe; Kazumi Ogura, Kobe; Shigeru Ohkura, Kobe, all of Japan

[73] Assignee: Mitsubishi Jukogyo Kabushiki Kaisha, Tokyo, Japan

[21] Appl. No.: 669,019

[22] Filed: Mar. 13, 1991

[30] Foreign Application Priority Data

Mar. 13, 1990 [JP] Japan .................................. 2-61679
Mar. 30, 1990 [JP] Japan .................................. 2-83864

[51] Int. Cl.⁵ ............................................ H01M 8/04
[52] U.S. Cl. ........................................ 429/26; 429/34
[58] Field of Search ....................... 429/26, 34, 120

[56] References Cited

U.S. PATENT DOCUMENTS

3,539,397 11/1970 Keating et al. ............... 429/26 X
4,520,082 5/1985 Makiel ........................... 429/26
4,910,100 3/1990 Nakanishi et al. ............. 429/32

Primary Examiner—Stephen Kalafut

[57] ABSTRACT

A power generation system with flat fuel cells of solid electrolyte construction permits the building up of a large capacity system. There are a train of pile units of flat fuel cells of solid electrolyte disposed in a horizontally extending fuel gas duct. The gas fuel duct supplies to the train of pile units of flat fuel cells fuel gas. Each of said pile units of flat fuel cells has a horizontal flat flow path for the fuel gas disposed above each fuel-side porous electrode sheet of the fuel cell opening freely at two path ends on the opposing side faces of the pile unit. There is a horizontal flat flow path for the oxidant gas disposed beneath each oxygen-side porous electrode sheet separated from the fuel gas flow paths and each connected at two path ends to either a supply line or to an exhaust line for the oxidant gas. There is an afterburning region disposed downstream of said train of pile units of flat fuel cells, for burning at least a part of the spent fuel gas which has passed through the fuel cell using at least a part of the spent oxidant gas which has passed through the fuel cell, for generating a heat of combustion for use for preheating at least one of the feed gases to be supplied to the fuel cell.

12 Claims, 10 Drawing Sheets

POWER GENERATION SYSTEM WITH FLAT FUEL CELLS OF SOLID ELECTROLYTE

FIELD OF THE INVENTION AND RELATED ART STATEMENT

The present invention relates to an electric power generation system with flat fuel cells of solid electrolyte. The fuel cells use a fuel gas, such as, coal gas, hydrogen gas or natural gas.

Figure 9:
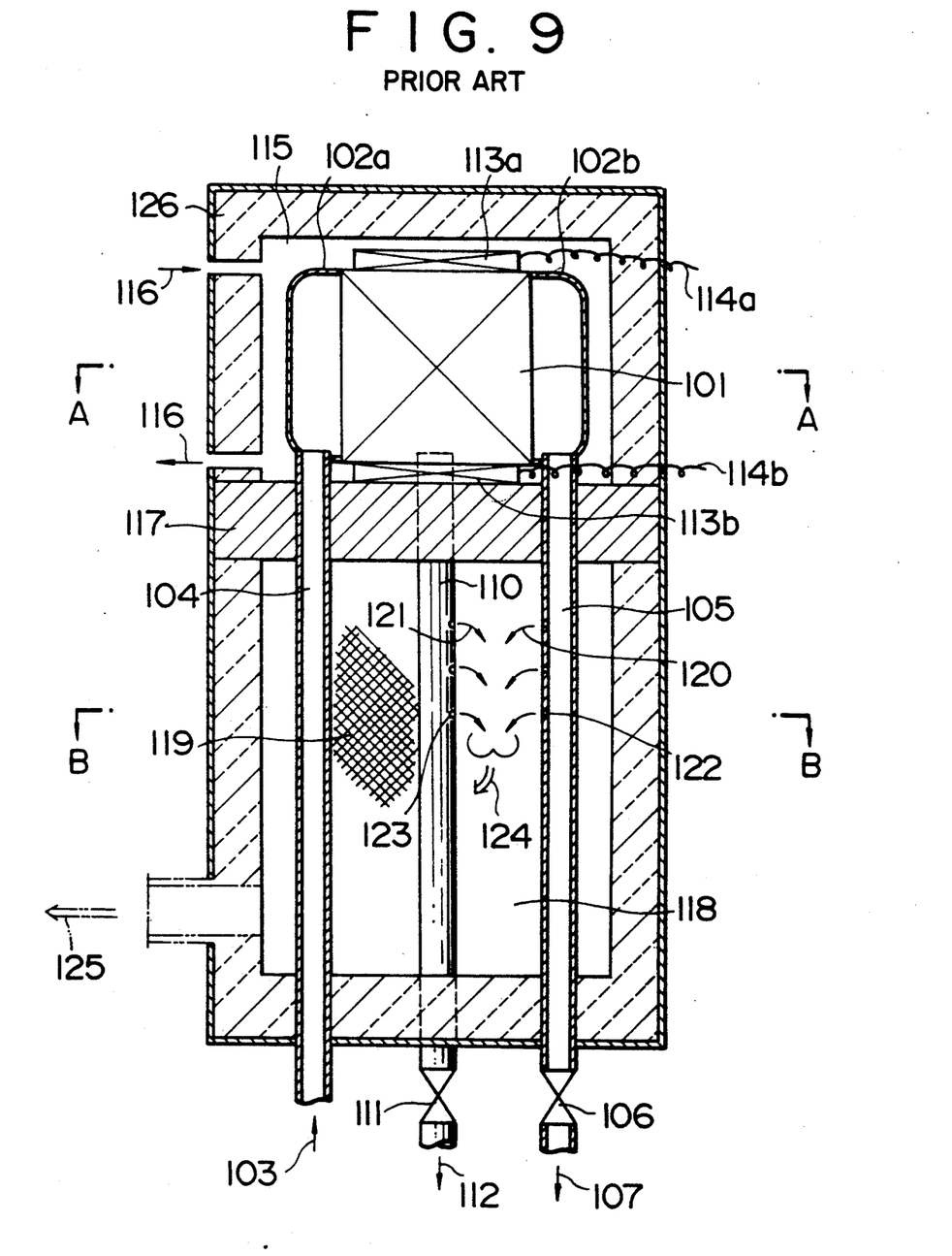
FIG. 9 shows an example of power generation system with fuel cells of solid electrode of prior art in a vertical section.
Figure 10:
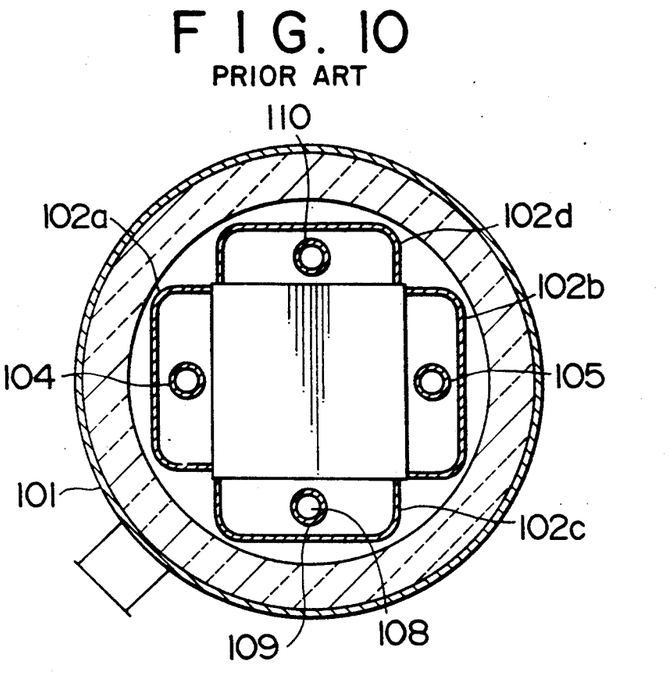
FIG. 10 is a horizontal section of the power generation system of FIG. 9 along the line A—A of FIG. 9.
Figure 11:
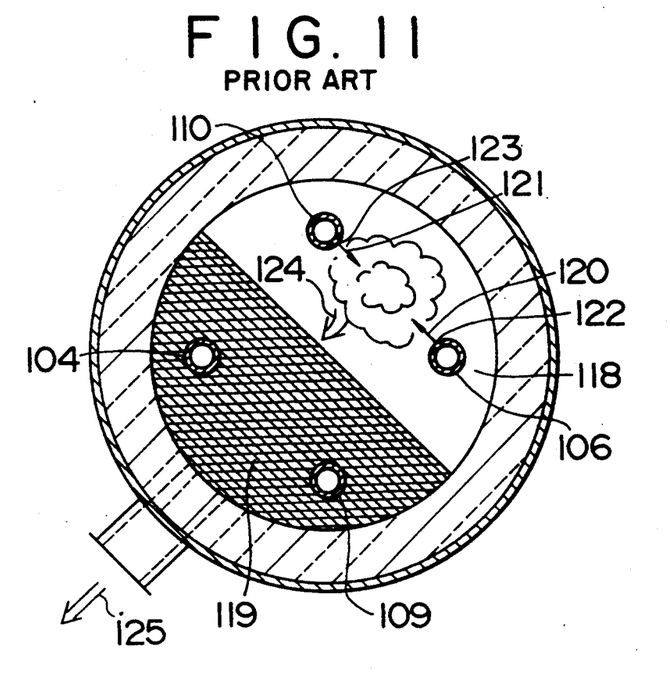
FIG. 11 is a horizontal section of the power generation system of FIG. 9 along the line B—B of FIG. 9.

For explaining a previous technique, reference is made to the FIGS. 9 to 11 or the drawing illustrating a previously proposed power generation system of self-sustaining outer manifold fuel cell with solid electrolyte (SOFC; Japanese Patent Application Kokai No. 54628/1989). In FIG. 9 is a vertical section of the system and FIGS. 10 and 11 are horizontal sections along the lines A—A and B—B of FIG. 9 respectively.

Figure 12:
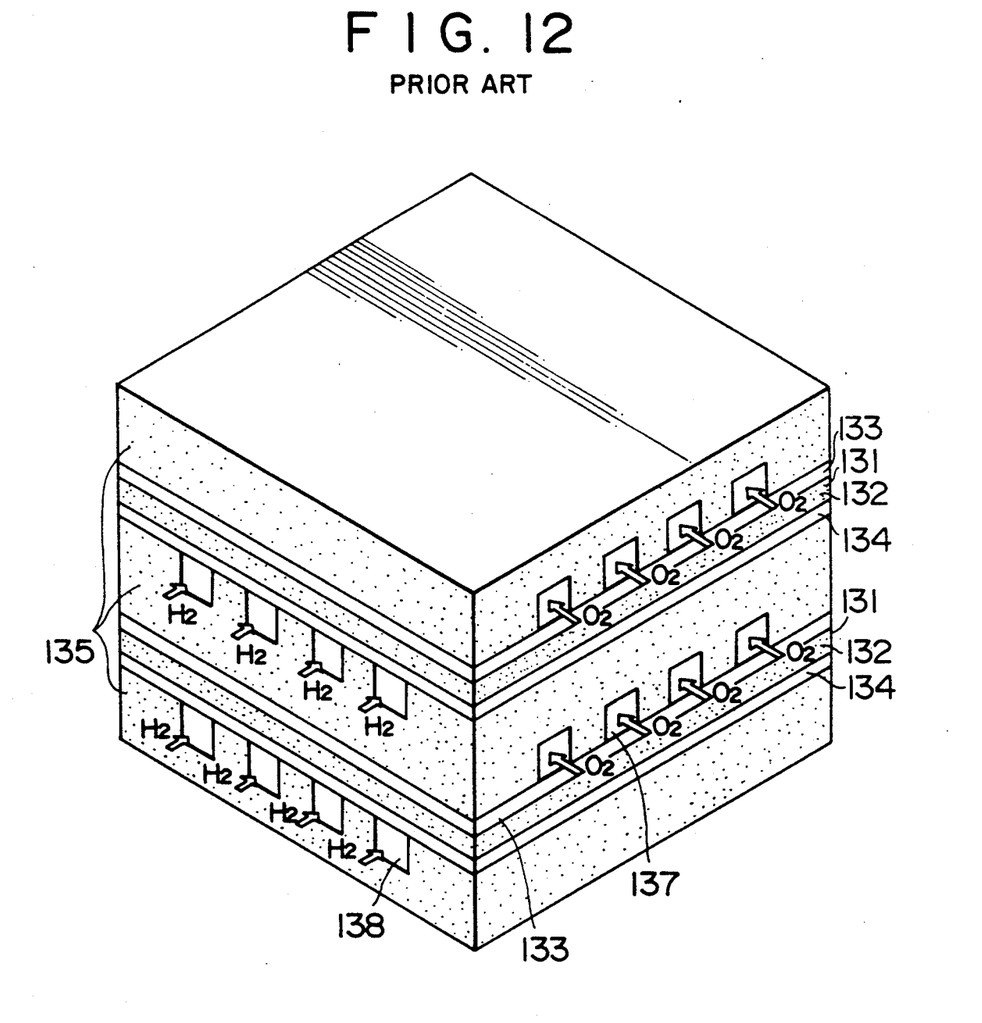
FIG. 12 shows an embodiment of the pile unit of fuel cells of prior art in a perspective illustration.
Figure 13:
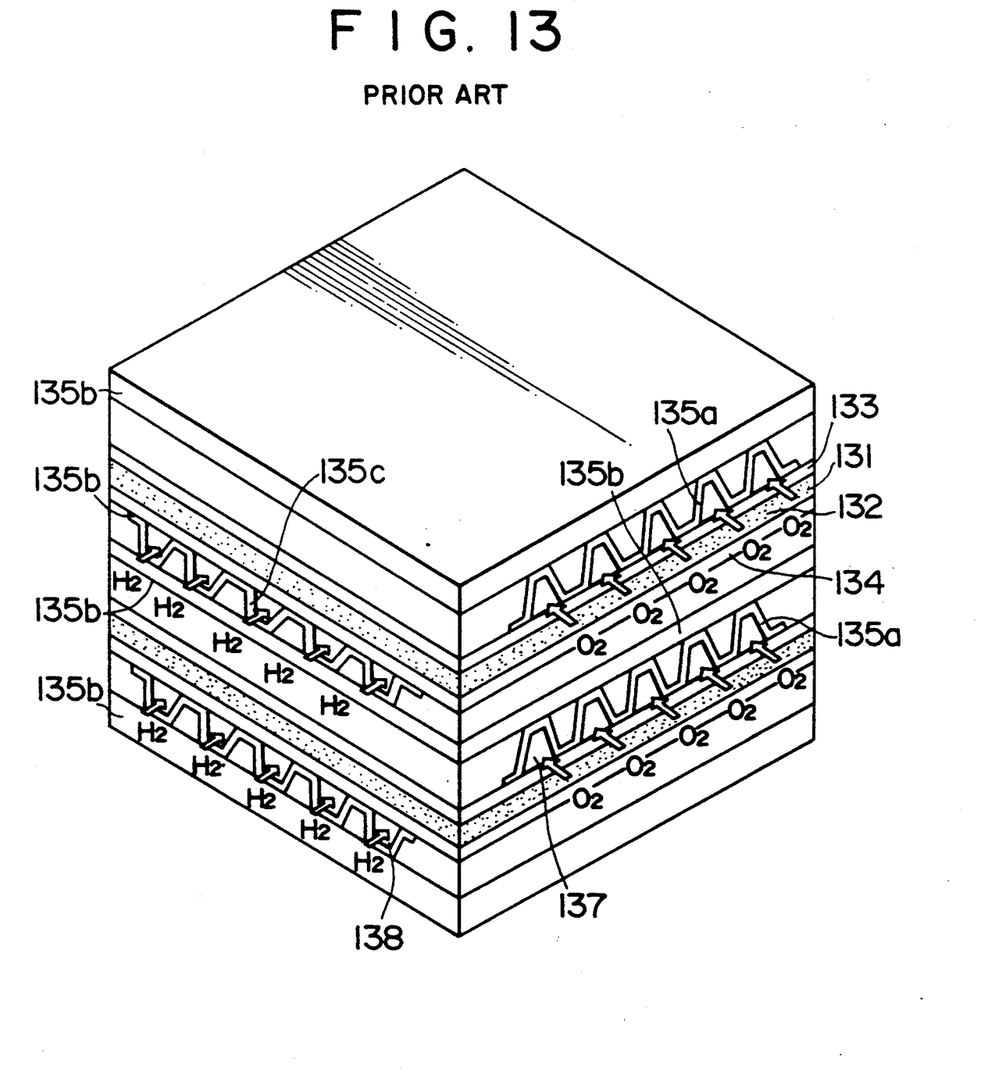
FIG. 13 shows another embodiment of the pile unit of fuel cells of prior art also in a perspective illustration.

The system as shown in FIG. 9 comprises a solid electrolyte fuel cell 101, construction of which is as shown in the appended FIG. 12 or FIG. 13 in perspective illustration wherein the fuel paths 138 and the oxidant paths 137 are disposed running rectangularly with each other. The outer manifolds 102a, 102b, 102c and 102d are arranged gas-tight on the outer sides of the fuel cell 101 in two pairs in such a manner that the fuel gas 103 supplied from a supply line enters the manifold 102a via an intake tube 104 and passes the fuel cell 101 to the manifold 102b to discharge out to the exhaust line 105. A similar flow path (109 - 102c - 101 - 102d - 110) for the other manifold pair for the oxidant exists also. The fuel gas reacts with the oxidant that has penetrated through the solid electrolyte on porous electrodes, liberating electrons flowing to the anode via an external wiring. The thus generated electric current is collected by collector plates 113a, 113b attached to the electrodes and passes through lead wires 114a, 114b for use as electric power.

The fuel cell 101 is accomodated in a chamber 115 filled with a non-oxidative gas (e.g. an inert gas, such as nitrogen, or a reducing gas, such as the fuel gas supplied) under recirculation 116. In order to prevent any oxydative influence on the electrodes, collector plates made of metal-ceramic composite material, terminals and metal wires at the higher temperature employed.

In the above prior art system, an after-burning chamber 118 is provided beneath the fuel cell chamber 115 separated therewith by a partition wall 117 to be served for burning a part of the "spent" fuel gas which has passed through the fuel cell 101 with the "spent" oxidant gas which has passed through the fuel cell 101, for generating a heat of combustion for use for the preheating of the feed gases supplied to the fuel cell. Passing through the after-burning chamber 118 are located the intake tubes 104 and 109 for supplying the feed gases, namely, the fuel gas and the oxidant gas, to the fuel cell, together with exhaust tubes 105 and 110 for the spent fuel gas and for the spent oxidant gas respectively each provided with many discharge nozzles 122, 123 for discharging into the after-burning chamber such an amount of each spent gas (121 and 122), as is required for preheating the feed gases, controlled by a pertinent actuation of corresponding regulator valves 106 and 111 on the exhaust lines. Inside the after-burning chamber 118, a porous radiation promotor filler 119 is piled around the intake tubes 104 and 109 to facilitate radiant heat transfer to the intake tubes, so as to realize an effective preheating (up to 1,000° C.) of the feed gases. The combustion gas 125 after being quenched by heat transfer to the feed gases is exhausted from the after-burning chamber 118 at its flue opening.

The fuel cell 101 has a piled construction such as illustrated in FIGS. 12 and 13. The fuel cell of FIG. 12 comprises a two-layered pile of elementary cells each composed of a thin sheet 131 of ceramic solid electrolyte made of, such as, yttria-stabilized zirconia (YSZ), having a thickness of 50–200 $\mu$m sandwiched between two porous electrode sheets 133 and 134 placed between two layers of a ceramic interconnector 135. The ceramic solid electrolyte thin sheet can be produced by, for example, molding a dense sheet from a slurry of YSZ fiber (which may have an average diameter of 3-6 $\mu$m and an average length of 1-2 mm) of a concentration of 10–90% by weight by a so-called doctor blade method or cold press method. The fuel-side electrode sheet 133 and the oxygen-side electrode sheet 134 are each made of a porous nickel oxide (NiO) which may be produced in a similar way as the solid electrolyte thin sheet by molding from a slurry of nickel oxide with an addition of 10–50% of an extinctive substance to be burnt off upon baking, sich as, naphthalene or the like. The interconnector layer 135 is made of a refractory ceramic, such as, $LaMgCrO_3$ or $LaCaCrO_3$, and can be prepared in a similar way as the ceramic solid electrolyte sheet by molding from a slurry of the refractory ceramic material with eventual addition of a fiber reinforcement of, such as, YSZ whisker or $Al_2O_3$ whisker of a diameter of, for example, 3–6 $\mu$m and a length of, for example, 1-2 mm in a content of 10–70% by weight. The so molded interconnector layer 135 having a thickness of about 2–10 mm has a sufficient number of parallel grooves 137 for conducting the oxidant gas, such as, oxygen or air, disposed on the side facing the oxygen-side electrode 133 and/or a sufficient number of parallel grooves 138 for guiding the fuel gas, such as, hydrogen or carbon monoxide, disposed on the side facing the fuel-side electrode 134 so as to extend at right angle to the grooves 137 for guiding the oxidant gas.

An alternative embodiment of the fuel cell has also a piled construction as illustrated in FIG. 13, which has been proposed for the purport of achieving a light weight of the fuel cell by a special design of the interconnector layer 135. Thus, the interconnector layer is subdivided into an oxygen path-defining layer 135a, a fuel path-defining layer 135c and a dense partition layer 135b for separating the feed gases completely with each other. Such a piled fuel cell can be prepared in such a way that the material layers to be laminated (135a, 135b and 135c; 131, 132, 133 and 134) are put one over another in the order in a state of green product, i.e. in a not completely dried condition, to build up an integral structure of the final construction, which is then dried and burnt.

In the prior art described above, a large size fuel cell is difficultly produced, since all the materials of construction of the SOFC are of ceramic. Thus, it has been attempted to construct a large scale power generation plant of fuel cell by installing a large number of unit systems such as shown in FIG. 9 in rows, whereby it has been unavoidable to subject to a cost increase and a considerable complexity in the design, dendering difficult to realize a large capacity plant.

In the prior art system described above, a high power generation efficiency has been difficult to attained due to insufficient utilization rate of the fuel gas, since the dimension of the SOFC is not large (about 1 kWA per unit system having a dimension of 15×15×15 cm).

Moreover, there were others problems in the prior art power generation systems left unsolved, such as follows:

(1) It is necessary to overcome the difficulty in attaining a reliable seal between the fuel gas and the oxidant gas as well as between the manifold and the conduits at a high temperature of about 1,000° C.

(2) Such a power generation system with fuel cells should be designed as a self-sustaining thermal system.

(3) Every leakage of gases must be suppressed over the entire system to be as low as possible.

(4) It is required to realize a compact design of the total system, even though the power generation capacity is increased.

In the past, it had been a practice to realize a gas tight seal between the gas sections at such a high temperature as 1,000° C., by an adhesive junction using different kinds of ceramic material for the adhesive layer. This has brought about, however, unsatisfactory results due to excessively large thermal expansion and contraction caused by the difference in the coefficient of expansion between the materials employed. Thus, it has been difficult to attain an effective prevention of occurrence of cracking, damage, rupture and breake down of seal layer, accompanied by a local superheating due to mixing of the fuel gas with the oxidant gas.

OBJECT AND SUMMARY OF THE INVENTION

The present invention has been attained taking into account of the circumstances and problems described above with an object of providing a power generation system using solid electrolyte fuel cells capable of realizing a high power generation efficiency and permitting an attainment of large power genration capacity with simple construction and a better seal characteristic between the gas sections.

Therefore, an aspect of the present invention concerns a power generation system with flat fuel cells of solid electrolyte, which comprises, a plurality of pile units of flat fuel cells of solid electrolyte disposed in a horizontally extending fuel gas duct adapted to supply said plurality of pile units of flat fuel cells with the fuel gas.

Each of said pile units of flat fuel cells having a horizontal flat flow paths for the fuel gas each disposed above each fuel-side porous electrode sheet and opening freely at both path ends on the opposing side faces of the pile unit and, a horizontal flat flow paths for the oxidant gas each disposed beneath each oxygen-side porous electrode sheet separately from the fuel gas flow paths and each connected at both path ends to either a supply line or to an exhaust line for the oxidant gas.

There is an after-burning region disposed downstream of said plurality of pile units of flat fuel cells for burning at least a part of the spent fuel gas which has passed through the fuel cell using at least a part of the spent oxidant gas which has passed through the fuel cell, for generating a heat of combustion for use for preheating at least either one of the feed gases to be supplied to the fuel cell and an assembly for electric current output for each of the fuel cell pile units, disposed in the stream of fuel gas.

By the power generation system according to the above first aspect of the present invention, a compact and simplified construction is realized due to exclusion of fuel gas feed conduit arrangement for each fuel cell, permitting thus to build up a large scale system without difficulty.

The arrangement of a train of the fuel cell pile units within a confined space in a form of a duct for conveying the fuel gas makes some leakage of the fuel gas from the cell to be tolerated so that a tight seal therefor may be dispensed with.

The installation of an after-burning region downsteam of the train of the fuel cell pile units for burning at least a part of the spent fuel gas using the spent oxidant gas enables an increased utilization rate for the fuel gas free energy by recovering it as the heat of combustion for preheating the feed gases to the requisite temperature level.

When a means for recirculating the remaining spent fuel gas to the fuel cell, for example, a blower with corresponding circulation conduit arrengement, is installed after the exit of the fuel gas duct, a further improvement in the utilization of the energy of fuel gas may be realized.

If a suitable means for recovering the heat of combustion of the combustion gas from the after-burning region, for example, heat exchanger for preheating the fuel gas feed and/or the oxidant gas feed, is installed in a gas exhaustion port disposed downstream of the fuel gas duct and of the oxidant gas exhaust line, the temperature of the feed gases can be elevated to a contemplated level to thereby realize maintainance of the optimum electrode reaction velocity and reduction of the useless start-up operation.

By separating the section of the fuel gas duct for the train of the fuel cell pile units from the section for the gas exhaustion port, on the one hand, and said fuel gas duct section from the section of spent oxidant gas exhaust line, on the other hand, each by means of a dense impermeable partition wall, any leakage of the fuel gas accumulated in the porous heat insulation material employed in the fuel cell housing into the exhaustion port and into the spent oxidant gas exhaust line can be prevented.

It is convenient for contributing to a tight seal at the gasket of the pile unit of the fuel cells that a means for applying weight onto the upper face of the pile unit is incorporated in order to cope with the considerable thermal expansion and contraction and to maintain requisite seal pressure. This may contribute further to maintain a better seal performance between the circumference of the fuel gas duct and the pile unit of fuel cells.

It is possible to provide a gas burner for facilitating start-up of routine run of the power generation system in a supply line of feed fuel gas supplying to the fuel gas dust or in the supply line of the feed oxidant gas, in order to heat the feed gas.

DETAILED DESCRIPTION OF PREFERRED EMBODIMENTS

The present invention will be described by way of one preferred example with reference to FIGS. 1 and 2, wherein the construction element same to that given in the foregoing description of the stand of the technique referring to FIGS. 9 to 13 is denoted by the same numeral symbol with the prior art one.

In a fuel gas duct 1, a plurality of flat fuel cells 101 of solid electrolyte explained previously are arranged in a train. A fuel gas recirculating blower 2 communicating to a recirculation gas conduit 3 is connected to the fuel gas duct 1. The fuel gas 4 recirculated by the blower 2 is introduced into each of the pile units of fuel cells 101 from its inlet duct via a gas recirculation duct as a recirculated gas flow 5. Under the fuel gas duct 1 is disposed a spent oxidant gas duct 6 in which the feed oxidant gas 108 flows. Element 7 is a high temperature gasket and 8 is an after-burner disposed in the spent gas duct 6 for burning the spent fuel gas 125 using the spent oxidant gas 112. The function of the power generation system of FIGS. 1 and 2 is as follows:

The feed fuel gas 103 passes, after admixing of the recirculated fuel gas 5 thereto, through the train of the pile units of fuel cells 101 installed in the fuel gas duct successively. The oxidant gas is supplied to each pile unit via the oxidant gas line 109 and an inlet manifold 102a and flows through each fuel cells 101 to an exit manifold 102b, from which it discharges out into the spent oxidant gas duct 6. Here, the electrode reaction of the fuel cells 101 is caused to generate electric power by consuming the fuel gas and the oxidant gas at its electrode sheets. The electric current is collected by a collector plate attached to each pile unit within the fuel gas atmosphere (reducing atmosphere).

Most of the spent fuel gas 107 which has passed through the fuel cell 101 flows into the spent oxidant gas duct 6 through an after burner nozzle 8 where the spent fuel gas is burnt by the oxydant gas introduced therein. The so produced high temperature combustion gas 124 flows into a non illustrated heat recovery means.

A part of the spent fuel gas 107 is sucked off by a recirculation blower 2 and is recirculated to the fuel gas duct 1 from each discharge pipe 5 disposed before each of the pile units. This recirculation of the spent fuel gas contributes to some conversion of the fuel gas (conversion of methane into hydrogen gas) and to a cooling of the fuel cells 101 (the amount of gas passing through the fuel cell is the sum of the amount of the fuel gas 103 from the supply line and the amount of the recirculated gas 4, so that an elevation of the temperature due to the heat evolution upon the electrochemical reaction on the fuel cell electrodes can be suppressed).

By this embodiment of the power generation system, advantageous effects are realized which are given below:

(1) Power generation systems of larger capacity can be realized with simplified construction.

(2) By recirculating the remaining spent fuel gas to the fuel cell, a further improvement in the utilization of the energy of fuel gas can be realized with simultaneous attainment of cooling of the fuel cell.

(3) By the arrangement of the inlet and exit manifolds 102a, 102b for the oxidant gas on the top and bottom of the pile unit, it is possible to cope with the thermal expansion and contraction and to maintain requisite seal pressure whereby leakage of the oxidant gas can be prevented.

(4) By the arrangement of a train of the fuel cell pile units within a confined space in a form of a duct for conveying the fuel gas, some leakage of the fuel gas from the cell may be tolerated so that a tight seal therefor can be dispensed with.

(5) By accomodating the current collector plate 113 within the fuel gas atmosphere (reducing atmosphere), any oxidative damage of the collector plate can be prevented.

Now, another preferred embodiment of the present invention is described below with reference to FIGS. 3 to 7.

Figure 3:
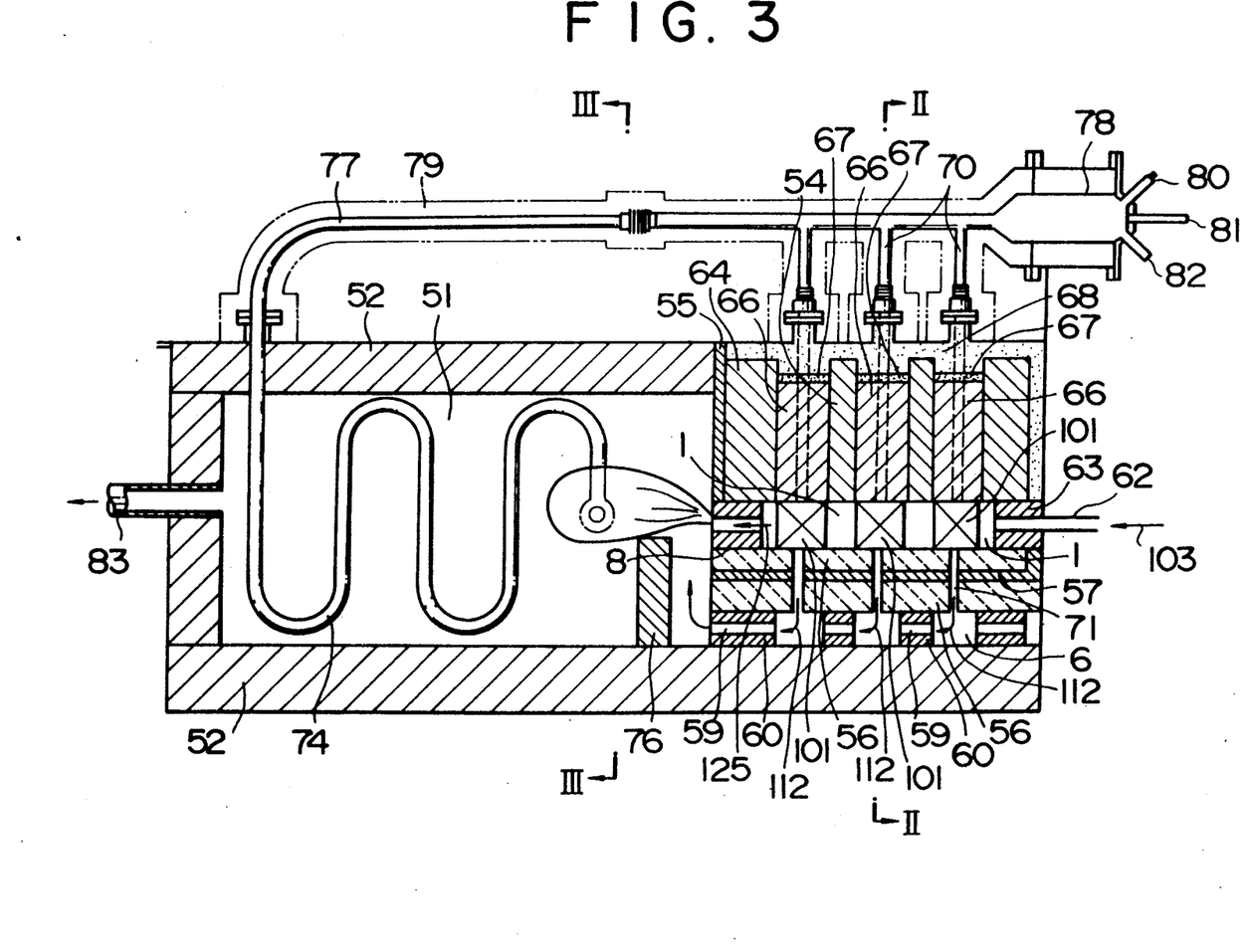
FIG. 3 shows another embodiment of the power generation system according to the present invention in a schematic vertical section.

This embodiment encompasses a large exhaustion port 51 for use for the space for heat recovery from the combustion of the spent gases, as an extension of the fuel gas duct defined by the top and bottom refractory walls 52, 52 and the refractory side walls 53, 53. In this fuel gas duct, a housing 54 for accomodating a train of the pile units of fuel cells is disposed separated from the exhaustion port 51 by a gas impermeable partition wall 55. The bottom of the pile unit train housing 54 is composed of a laminated refractory plate 56 having a gas impermeable interposed layer 57. Between the bottom refractory wall 52 of the duct and the housing bottom plate 56, a passage for flowing the spent oxydant gas 6 is formed in which several spacers 60 each having open hole 59 are inserted.

The pile unit train housing 54 is provided with an after burner 8 in its end wall adjacent to the exhaustion port 51. In the front end wall of the pile unit train housing 54 is provided a spacer 63 in which a fuel gas inlet tube 62 is inserted. As the top coverage of the housing 54, a refractory material block 64 provided with cut off holes for insertion in each a weight piece for applying weight to the pile unit. The pile unit is placed on the spacer 63 and on the after-burner 8. On the housing bottom 56, a train of the pile units of flat fuel cells of solid electrolyte 101 is installed. On each of the pile units 101, a weight piece 66 for applying weight to the seal gasket inserted in the corresponding cut off holes of said coverage block 64 is placed to press the pile unit. On each of the weight pieces 66, a heat insulator sheet 67 of refractory fiber for absorbing the thermal expansion and contraction is placed.

Figure 4:
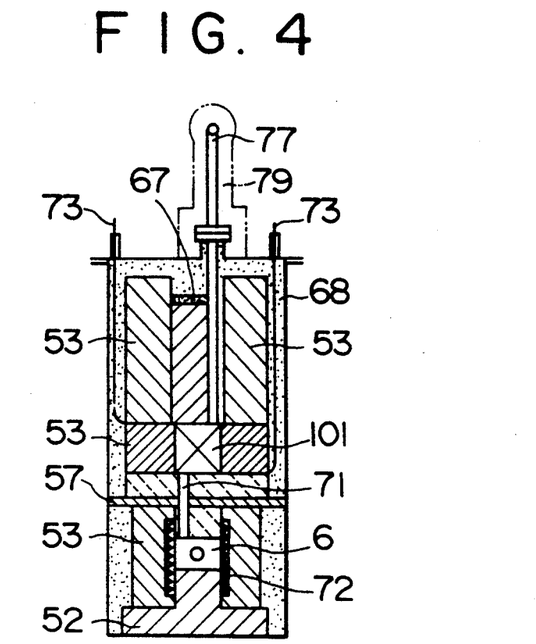
FIG. 4 is a vertical section of the power generation system of FIG. 3 along the line II—II of FIG. 3.
Figure 5:
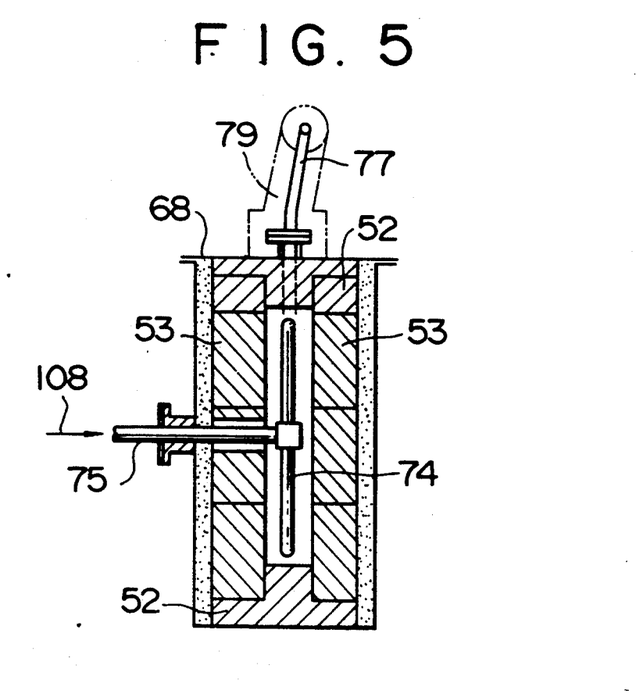
FIG. 5 is a vertical section of the power generation system of FIG. 3 along the line III—III of FIG. 3.

The refractory material coverage block 64 including the weight pieces 66 and the heat insulator sheets 67 is embedded in a refractory material ceiling 68. Thus, the pile unit train housing composed of the ceiling 68, the after-burner 8, the spacer 63 and the refractory bottom plate 56 surrounds therein a fuel gas passage 1. Through each of the weight pieces 66, a branch pipe 70 made of non-conductive ceramic material for supplying the oxidant gas branched from an oxidant gas supply main 77 is inserted. Through the housing bottom 56, corresponding outlet tubes for guiding the spent oxidant gas 112 to the spent oxidant gas duct 6 are arranged. Inside the spent oxidant gas duct 6, a heater 72 having a electric wiring 73 for controlling the temperature of the spent oxidant gas is provided, as shown in FIG. 4. Inside the exhaustion port 51, an oxidant gas preheating heat exchanger 74 composed of a meandering metal tube is provided. One end of the heat exchanger 74 is connected to an oxidant gas supply main 77 and the other end of the heat exchanger confronts the after-burning region of the burner 8 and connects to an external supply line 75 through the side wall 53, as shown in FIG. 5. A refractory baffle block 76 is positioned facing the spent oxidant gas duct 6 to deflect the spent oxidant gas towards the after-burning region. The oxidant gas supply main 77 connected to the heat exchanger 74 is made of a non-condictive ceramic material and is connected to the branch pipe 70 as mentioned above. The other end of the oxidant gas supply main 77 is provided with a start-up burner 78 furnished with a firing means 80, a fuel gas supply tube 81 and an oxidant gas supply tube 82. The oxidant gas supply main 77 inclusive of the branch pipes 70 and the start-up heater is insulated with an insulator 79. An exhaustion pipe 83 is connected to the exhaustion port 51 through the refractory end wall thereof.

Figure 6:
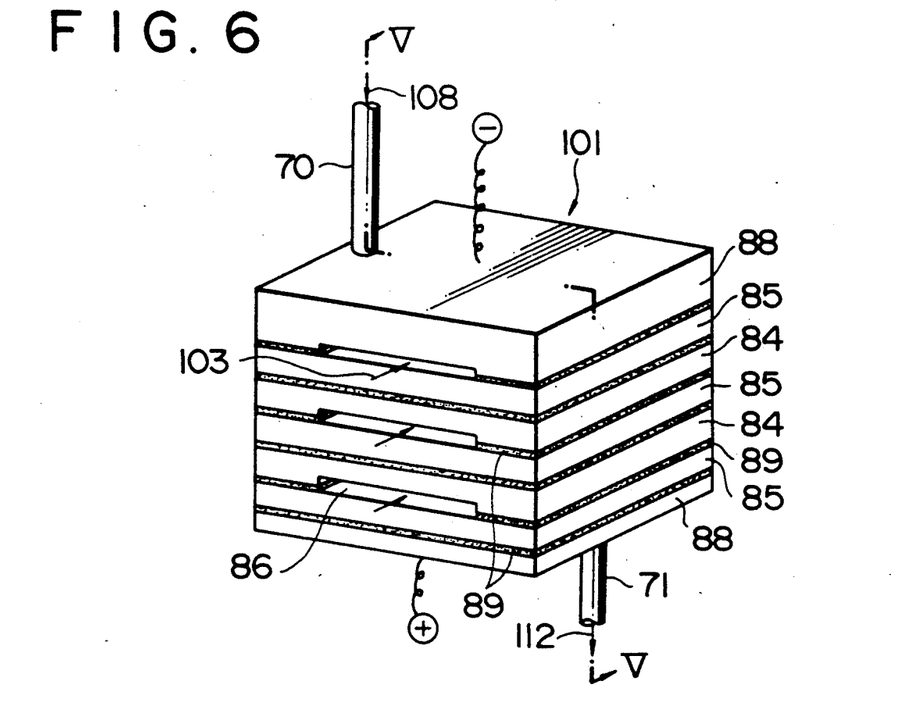
FIG. 6 shows an embodiment of the pile unit of fuel cells according to the present invention in a perspective illustration.
Figure 7:
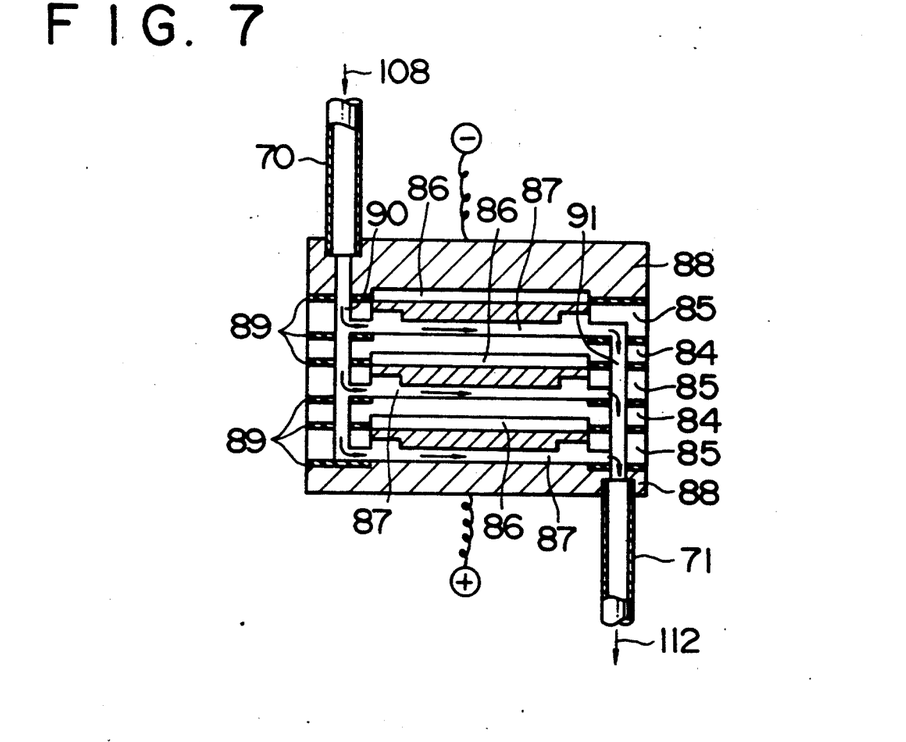
FIG. 7 is a vertical section of the pile unit of FIG. 6 along the line V—V of FIG. 6.

The pile unit of the flat fuel cells 101 has horizontal flat flow paths 56 for the fuel gas each disposed above each fuel-side porous electrode sheet supported by a supporting frame 55. Under each porous oxygen-side electrode sheet, there is provided a horizontal flat flow path 87 for the oxidant gas. The fuel gas flow path and the oxidant gas flow path are separated by an interposed interconnector 84. The solid electrolyte plates having the electrode sheets are supported by a supporting frame 85. The horizontal flow path 86 for the fuel gas opens freely at the both path ends on the opposing side faces of the pile unit. The horizontal flow paths 87 for the oxidant gas are connected at both the path ends to either an oxidant gas supply line 108 via a manifold 90 and the branch pipe 70 or to the spent oxidant gas outlet tube via an oxidant gas collecting manifold 91 and an exhaust pipe 71. The top and the bottom of the pile unit is provided with either a junction flange 88 fixed to the oxidant gas branch pipe 70 or a junction flange 88 fixed to the exhaust pipe 71. Between the junction flange 88, the interconnector 84 and the supporting frame 85, each a seal gasket 89 is inserted.

The oxidant gas branch pipe 70 and the oxidant gas flow paths 87 are connected by the oxidant gas manifold 90 for distributing the oxidant gas to the flow paths 87. The oxidant gas flow paths 87 and the spent oxidant gas exhaust pipe 71 are connected by the oxidant gas collecting manifold 91.

All the heat insulating materials and refractory materials employed in the above described power generation system are made of ceramic material capable of resisting to a temperature of 1,000° C. and higher. Also, the solid electrolyte of the fuel cell is made of a ceramic material.

Below, the function of the above power generation system is described.

(1) Upon the Start-up

The fuel gas 103 guided from the fuel gas supply line (62) is supplied to the pile unit 101 of flat fuel cells of sold electrolyte through the fuel gas passage 1.

The oxidant gas 108 (air) guided from the oxidant gas supply line 75 passing through the side wall 53 of refractory material of the exhaustion port 51 is supplied to the pile unit 101 of flat fuel cells through the oxidant gas preheating heat exchanger 74, the oxidant gas supply main 77 and the plurality of the branch pipes 70.

After passing the pile unit 101, the spent oxidant gas 112 is exhausted therefrom into the exhaustion port 51 through the spent oxidant gas exhaust pipes 71 and the spent oxidant gas duct 6. The spent oxidant gas 112 is deflected here upwards towards the after-burning region by the refractory baffle block 76.

The spent fuel gas 125 passed through the pile unit 101 is exhausted therefrom into the exhaustion port 51 through the fuel gas passage 1. The spent fuel gas 125 is burnt at the after-burner 8 by the spent oxidant gas 112. The heat of combustion produced thereby is recovered by the meandering heat exchanger 24 for preheating the oxidant gas. The combustion gas is exhausted via a exhaustion pipe 83 to the chimney.

Upon the start-up of the power generation system described above, times are required for reaching at the routine run temperature of 1,000° C. Therefore, the start-up burner 78 is operated at the start-up. By actuating the start-up burner 78, the oxidant gas 108 supplied to the branch pipes 70 is heated. By causing reaction of the so heated oxidant gas 108 with the fuel gas 103, the temperature of the pile unit of flat fuel cells 101 can reach at the rated temperature. By firing the spent fuel gas 125 at the after-burner using the spent oxidant gas 112 as described above, the oxidant gas passing through the preheating heat exchanger 74 disposed in the exhaustion port 51 is heated. The thus preheated oxidant gas passed through the haet exchanger 74 is then supplied to the pile units 101 through the oxidant gas supply main 77 and the plurality of branch pipes 70.

In this manner, the electrode reaction at the fuel cells is further accelerated to reach the rated temperature, whereby the start-up period can be cut down.

(2) Routine Running

Upon reaching the rated temperature of the pile unit, the start-up burner 78 is extinguished and the operation of the power generation system is effected using the ordinary oxidant gas and the fuel gas as a self-sustaining power generation system. Here, it is possible to actuate the temperature controlling heater on requirement in order to reach the above rated temperature.

Now, the principle of the power generation is described briefly below with reference to FIGS. 7 and 8.

The fuel gas 103 from the fuel gas passage 1 is supplied to each of the horizontal flat flow paths 86 and flows over the fuel-side electrode sheet. The oxidant gas 108 introduced from the branch pipes 70 is distributed via the manifold 90 to each of the oxidant gas flow paths 87 and flows under the oxygen side electrode sheet. The thereby produced electric current is collected through the lead wirs connected to the upper and the bottom junction flanges 88.

While, in the above described embodiment, the start-up burner 78 and the heat exchanger 74 for preheating the oxidant gas 108 are provided in the oxidant gas supply line, the same function can be attained by providing a heat exchanger for preheating the fuel gas and a start-up burner in the fuel gas supply line 62.

The heat exchanger for preheating the oxidant gas or that for preheating the fuel gas may be finned one.

Figure 1:
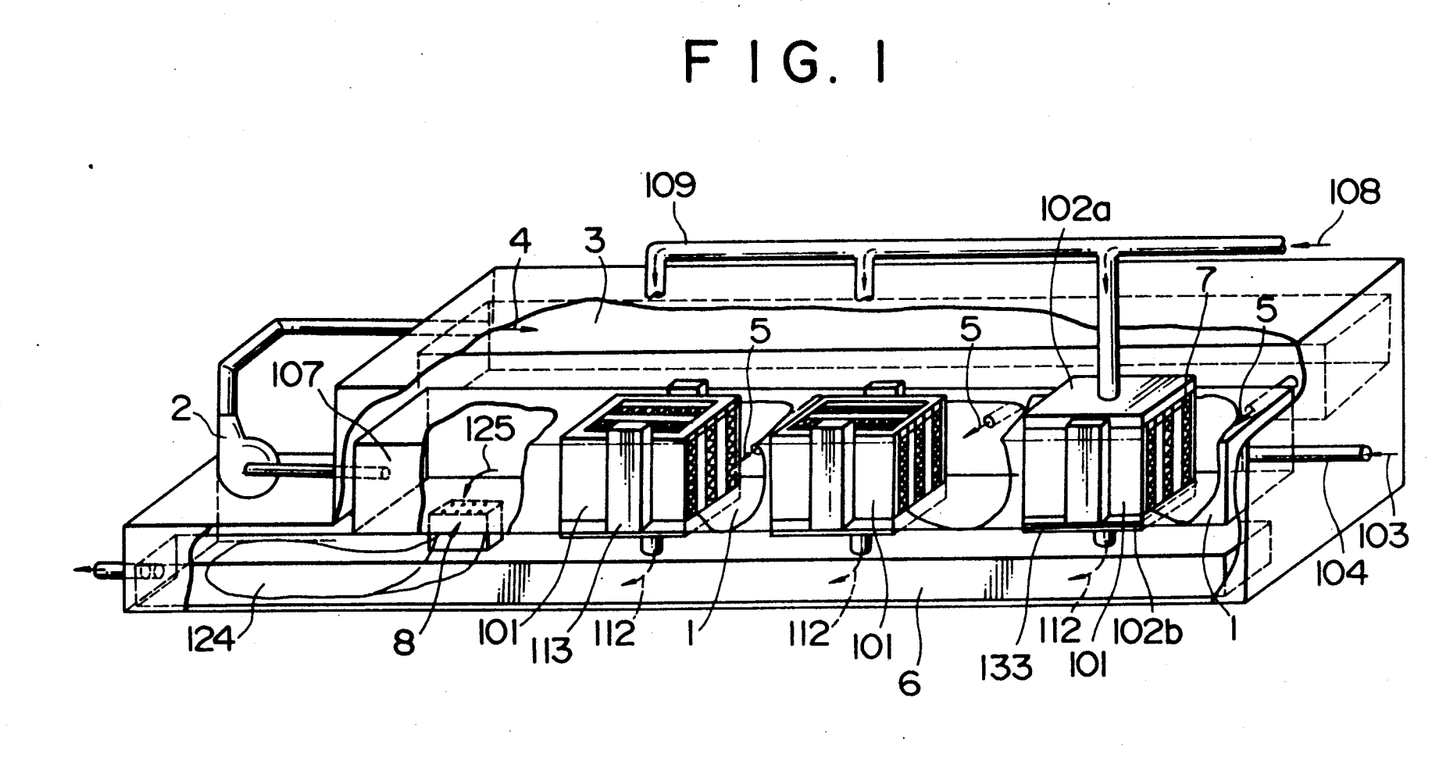
FIG. 1 is a schematic perspective view of an embodiment of the power generation system according to the invention.
Figure 2:
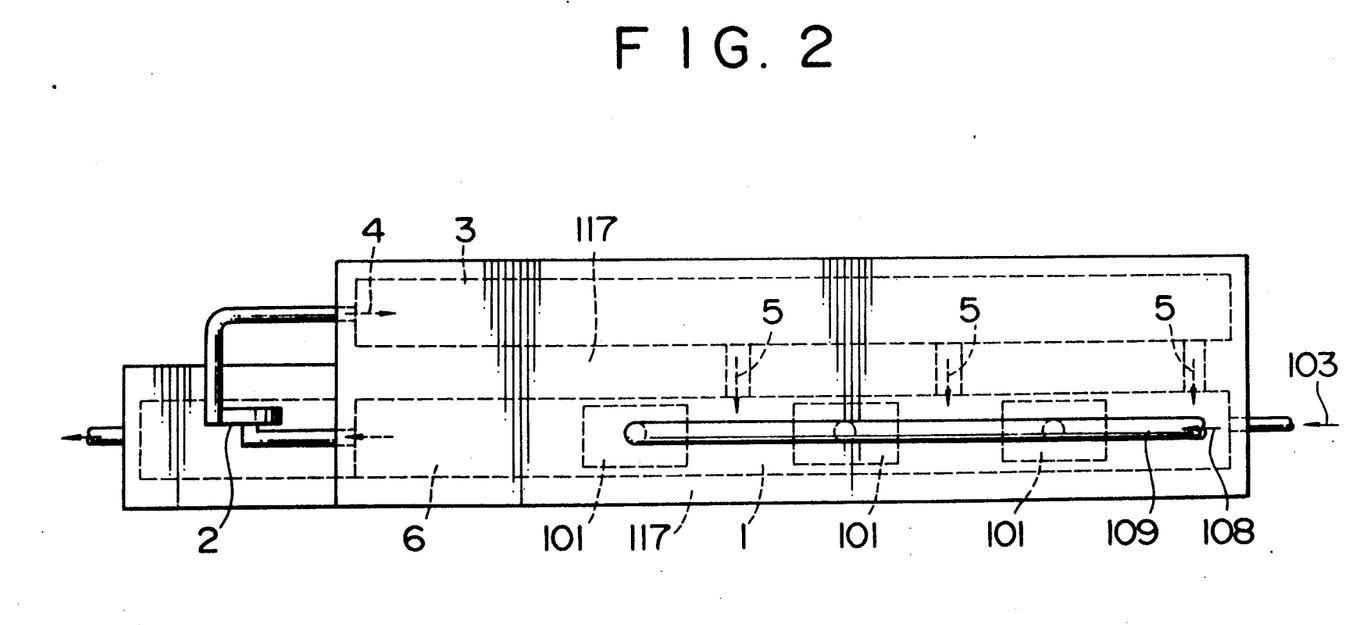
FIG. 2 is a schematic elevation of the power generation system of FIG. 1.

The power generation system according to the present invention should not be restricted to the specific embodiments of FIGS. 1-3. It is possible, for example, that the entire system is accomodated in a casing of refractory material 92 and the pile unit train housing is surrounded by gas impermeable partition walls 93a-93c, as shown in FIG. 8. Here, it is possible to provide the housing walls with a cooling means, such as, air-cooling tubes 94 (or water-cooling tubes) on the out side or both sides of these gas impermeable partition walls. Oxidant gas passages 95 are then disposed within the refractory material wall 92 and a start-up burner 97 is disposed on an outer face of the side wall so as to communicate to the oxidant passage 95.

Figure 8:
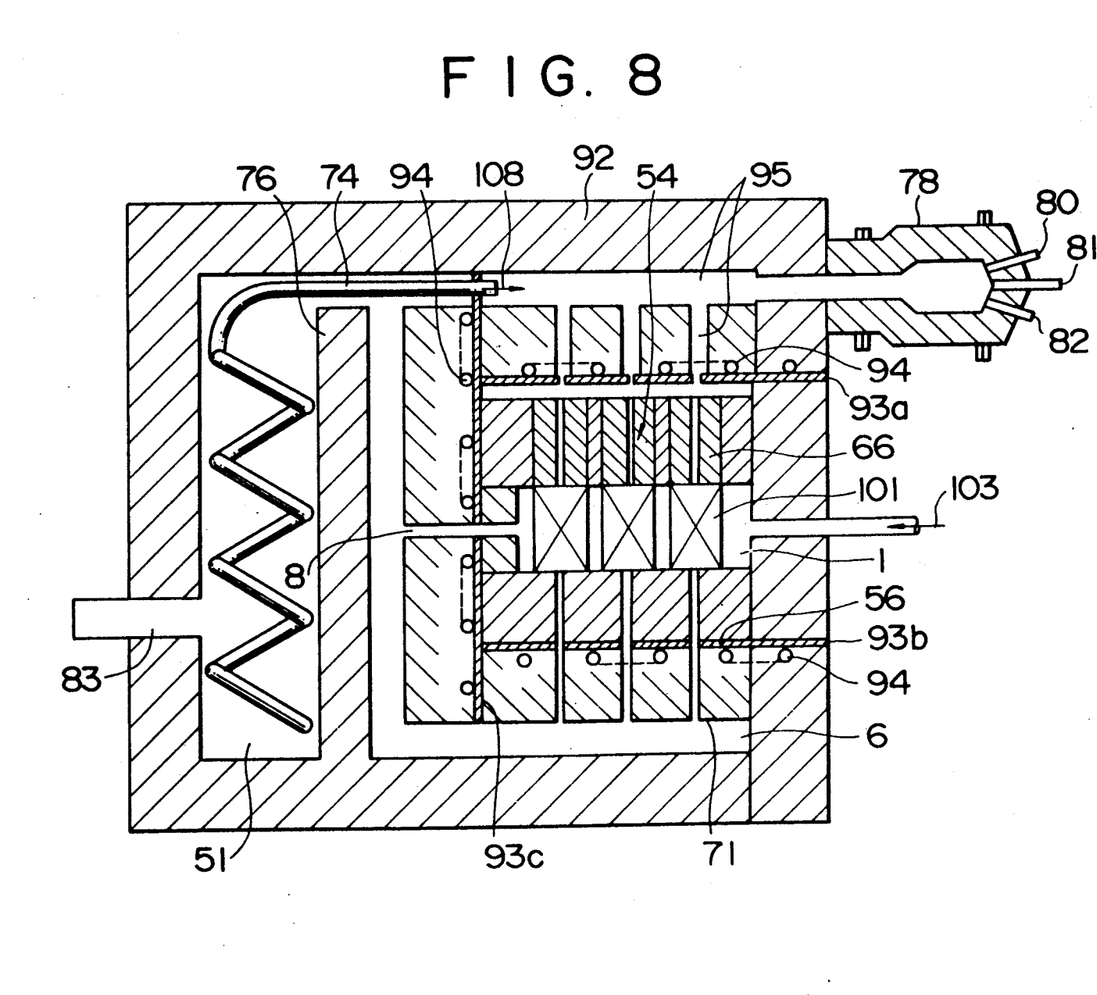
FIG. 8 shows a further embodiment of the power generation system according to the present invention in a vertical section.

In this embodiment of FIG. 8, all other construction elements corresponding to those of FIG. 3 are indicated by the same numeral symbols as in FIG. 3 and the explanation therefor is omitted.

By the construction of FIG. 8, it is possible to realize a heat recovery by the air-cooling tubes 94 (or water-cooling tubes) and a more compact design of the entire system as compared with that shown in FIG. 3 can be attained by the arrangement of construction elements inclusive of the oxidant gas lines within the refractory material walls.

We claim:

1. A power generation system with flat fuel cells of solid electrolyte comprising:
    (a) a plurality of pile units of flat fuel cells of solid electrolyte disposed in a row in a horizontally extending fuel gas duct adapted to supply to said plurality of pile units of flat fuel cells fuel gas,
    (b) each of said pile units of flat fuel cells having;
        (1) a plurality of horizontal flat flow paths, each with a first and second end for fuel gas, each disposed above each fuel-side porous electrode sheet and opening freely at both path ends on the opposing side faces of the pile unit; and,
        (2) a plurality of horizontal flat flow paths each with a first and second end for oxidant gas each disposed beneath each oxygen-side porous electrode sheet and separated from the fuel gas flow paths, and a first path end connected to a supply line and a second path end connected to an exhaust line for the oxidant gas,
    (c) an after-burning region disposed downstream of said plurality of pile units of flat fuel cells for burning at least a part of the spent fuel gas which has passed through the fuel cell using at least a part of the spent oxidant gas which has passed through the fuel cell, for generating a heat of combustion for use for preheating at least the feed gases to be supplied to the fuel cell; and
    (d) an assembly for electric current output for each of the fuel cell pile units, disposed in the stream of fuel gas, so that the assembly will not be subject to oxidation.

2. A power generation system as claimed in claim 1, further comprising:
    (e) means for recirculating the spent fuel gas which has passed through a fuel cell to another fuel cell, said recirculating means including a blower and a recirculation duct line.

3. A power generation system as claimed in claim 1, further comprising:
    (f) heat recovery means provided downstream of a delivery line from a fuel gas duct and of an oxidant gas exhaust line for recovering heat of combustion generated in an after-burning region for preheating at least the feed gases.

4. A power generation system as claimed in claim 3, wherein the power generation system is partitioned between a heat recovery section and a fuel cell accomodating housing disposed in the fuel gas duct and between the spent oxidant gas exhaust line and the fuel gas duct each using a gas impermeable partition wall.

5. A power generation system as claimed in claim 1 further comprising:
    means for applying weight on the pile unit of fuel cells, so that an effective gas seal is maintained.

6. A power generation system as claimed in claim 1, wherein a gas burner for facilitating start-up of routine run of the power generation system is provided in a supply line of feed fuel gas to the fuel gas duct or in the supply line of the feed oxidant gas, in order to heat the feed gas.

7. A power generation system as claimed in claim 1, further comprising:
    means for directing fuel gas directly from a second end of one fuel cell to a first end of the next adjacent fuel cell.

8. A power generation system with flat fuel cells of solid electrolyte, comprising:
    a housing containing at one end a plurality of fuel cells in a row;
    an after burner located adjacent to a fuel cell located at the end of the row;
    an exhaustion port in a second end of said housing located adjacent to said after burner; and
    a refractory block with holes located at a top of the housing, each hole containing a weight piece for pressing on the fuel cells, so that an effective seal is provided.

9. The power generation system as claimed in claim 8, further comprising:
    a heat insulator sheet located on each of said weight pieces for absorbing thermal contraction and expansion.

10. The power generation system as claimed in claim 9 further comprising:
    a refractory material embedding said refractory blocks, each weight piece and each insulator sheets.

11. The power generation system as claimed in claim 8 further comprising:
    a heat exchanger located in said housing.

12. A power generation system with flat fuel cells of solid electrolyte, comprising:
    a casing of refractory material containing a plurality of flat fuel cells aligned in a row;
    an after burner located adjacent the last fuel cell in said row;
    gas impermeable walls within said casing substantially surrounding the plurality of flat fuel cells; and
    means for cooling located between said gas impermeable walls and said casing;
    said means for cooling including a tube for carrying fluid.

* * * * *